Dec. 11, 1945.　　　E. C. YOUNG　　　2,390,631
WELDING ROD HOLDER
Filed July 17, 1942　　　2 Sheets-Sheet 1
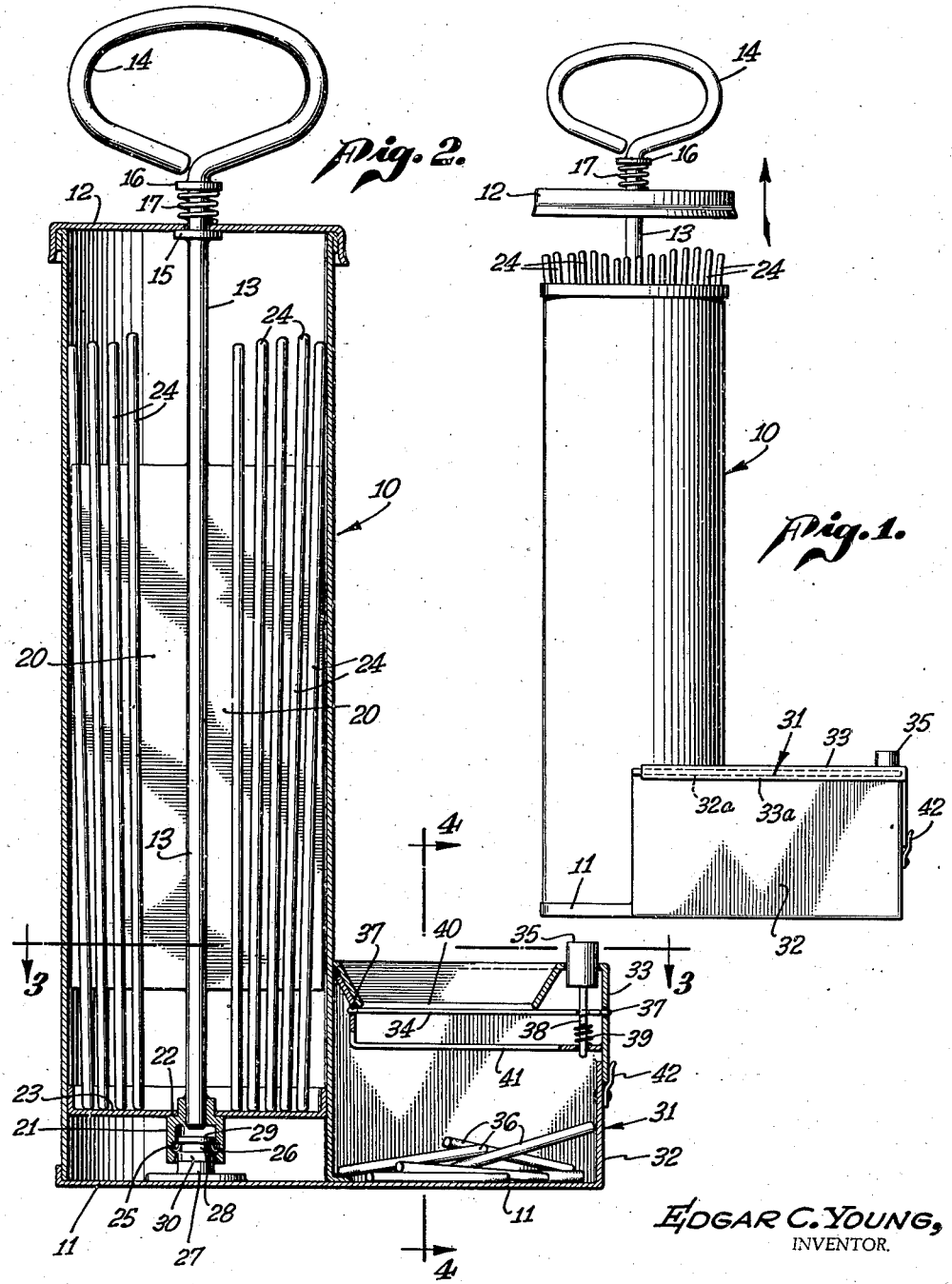
EDGAR C. YOUNG,
INVENTOR.
BY
ATTORNEY.

Dec. 11, 1945. E. C. YOUNG 2,390,631
WELDING ROD HOLDER
Filed July 17, 1942 2 Sheets-Sheet 2

EDGAR C. YOUNG,
INVENTOR.

BY
ATTORNEY.

Patented Dec. 11, 1945

2,390,631

UNITED STATES PATENT OFFICE 2,390,631

WELDING ROD HOLDER

Edgar C. Young, Long Beach, Calif., assignor of one-fourth to Irving Hertz and one-fourth to Nathan Nagel, both of Long Beach, and one-fourth to Herbert A. Huebner, Los Angeles, Calif.

Application July 17, 1942, Serial No. 451,286

5 Claims. (Cl. 312—78)

In welding it is common for the welder when assigned a job to pick up a bundle of welding rods and carry them to the place of work, where the rods are exposed to weather and to the possibility of being lost or kicked away, a circumstance particularly wasteful of material and efforts on many jobs as for example in shipbuilding, where a bundle of rods may fall through into the hold where it is difficult if not impossible to retrieve them.

Furthermore, it has been common practice for welders to discard the butts on the floor or scaffold wherever the work is being done and although this metal is valuable for reforming into rods, most of it has been wasted.

It is an object of my invention to provide a welding rod container in which new rods are placed and made readily available to the workmen and which provides in conjunction a receptacle for short ends which have to be discarded, and which enables a check to be kept on butts, insuring that the workman return all butts for reclaiming.

In the drawings:

Figure 1 is a vertical side view of a welding rod container and receptacle for butts embodying my invention.

Figure 2 is a vertical cross-sectional view of the same.

Figure 5:
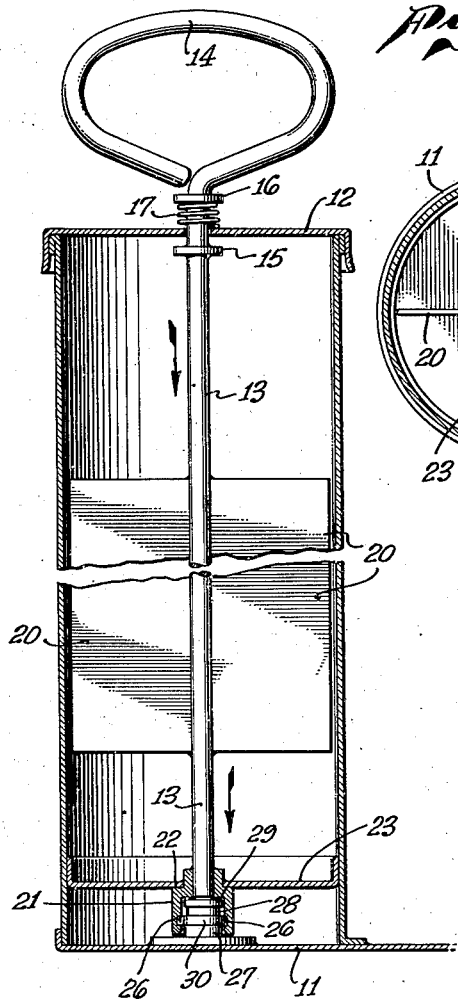
Figure 5 is a vertical side view of the container showing one of the operations in unlatching, as later described.
Figure 3:
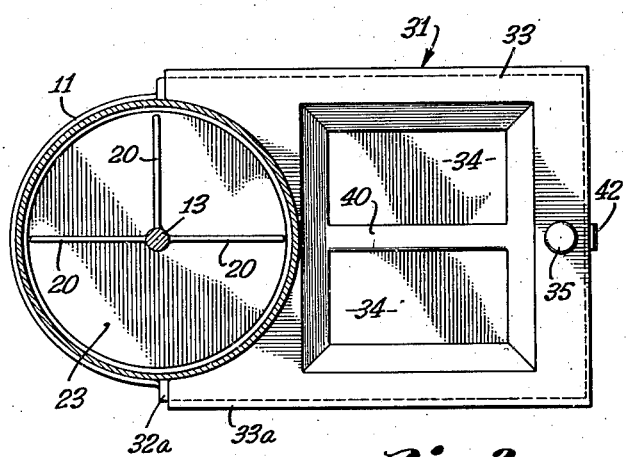
Figure 3 is a horizontal view partly in cross-section taken on the line 3—3 of Figure 2.

Referring to Figure 1, my invention comprises a tubular container 10 having a base 11 and a removable cap or cover 12.

Sustained upon the cap 12 is a rod 13 ending in a handle 14, and having a limited reciprocal movement through the cap 12 by reason of flanges 15 and 16 and a compression spring 17 in the relationship illustrated. The rod 13 is normally held at the upper limit of its movement by the action of the spring 17.

On this rod may be secured partition members 20 effectively dividing the interior of the container into a plurality of compartments in which welding rods of different sizes or metals may be separately held. These partitions are not an essential part of the invention but afford a convenience.

At the lower end of the rod 13 is welded or otherwise attached a hollow boss 21 having a shoulder 22 upon which rests and to which may be welded a circular movable bottom or platform 23 adapted to sustain the welding rods 24 within the container.

The cap and its associated parts are removably latched in place by the boss 21 in conjunction with a spring latch device to be described.

The boss is formed with a recess 25 within which is placed one or more springs 26 preferably U-shaped in cross-section. Upon the base 11 is mounted a pedestal 27 having an axis aligned with the axis of the rod 13. The pedestal 27 is formed with a reduced section 28 and a flange 29 at the upper end. Slidably mounted upon the reduced section 28 is a ring 30. The closure is shown latched in Figure 2 where the spring has entered between the flange 29 and the ring 30. When thus latched, the entire device may be lifted by the handle 14 and carried from place to place. If it is dropped it will remain closed and the welding rods will be held intact.

Figure 6:
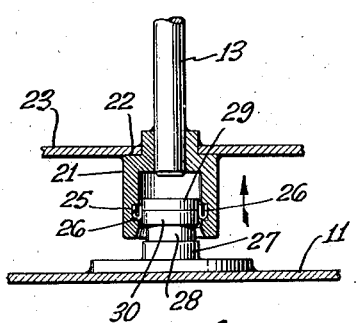
Figure 6 is an enlarged fragmentary view of a latching mechanism shown in Figures 2 and 5 but in a different position.

When it is desired to open the container, the handle is depressed as shown in Figure 5, which causes the spring 26 to be compressed and to slip over the ring 30. The spring is thus held compressed upon the next movement which is an upward stroke of the rod 13 (see Fig. 6) and the spring passes flange 29 enabling the rod and its attached parts to be removed from the container. For this purpose the flange 29 should be of a diameter no greater than that of the ring 30 and possibly slightly smaller. After the welder has secured the rod which he wishes he replaces the cover 12 and the downward movement of the rod 13 and boss 21 causes the ring 30 to be pushed downwardly in advance of the spring (if it has not already fallen down by gravity), and the spring expands under the flange 29 whereby the parts are again latched together. The weight of the rod and the parts it carries is ordinarily sufficient for the latch to engage by gravity.

Secured upon the base 11 and against the lower wall of the container 10 is a receptacle 31 for butts or stubs of rods. This receptacle comprises a lower section 32 permanently mounted, and a removable cover 33. The cover is provided with guides 33a sliding on flanges 32a, and is held by a spring latch 42. This latch can be manually sprung outwardly to permit the vertical wall of the cover to pass when installing the cover.

Figure 4:
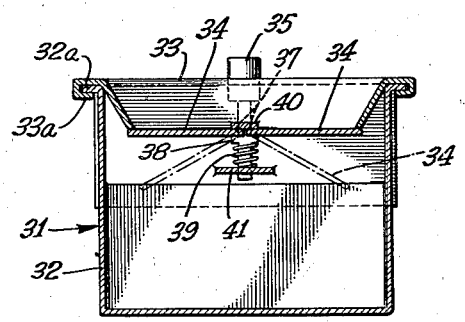
Figure 4 is a vertical cross-sectional view of the butt receptacle taken on the line 4—4 of Figure 2.

The cover 33 is provided with flat spring actuated closures 34 which operate by depression of a button 35 to open into the position shown in dotted lines in Figure 4 whereby the butts 36 of welding rods 24 may be deposited. When the workman has completed a job and returns to the stockroom for a new set of rods, the cover 33 is removed and the short ends counted and accumulated for reclaiming.

The form of mechanism shown for operating the closures 34 includes end pivots 37 for the closures, a stationary bar 41 supporting a compression spring 39, and a yoke 38 urged by the spring against the closures. The yoke is connected to the button 35. When the button is depressed, the yoke falls away, and the closures pivot by gravity as shown by dotted lines in Figure 4.

An additional function is obtained by making the base 11 substantially larger than the bottom of the container 10 and mounting upon it the receptacle 31. The added area and weight contribute to the stability of the device as a whole standing in a vertical position at the scene of work.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Having described my invention, what I claim as new and desire to secure by Letters Patent is:

1. A container for welding rods and the like comprising a tubular member, a platform slidable therein and adapted to sustain welding rods or the like within said member, a cap to cover the upper end of said member, a rod attached to said cap and to said platform and provided with a handle for simultaneously removing the cap and elevating the platform to raise the welding rods above the upper end of the tubular member, a base supporting the tubular member, and a latch device between the platform and the base removably locking the platform in its lower position, said latch device comprising co-acting parts one of which is fixedly secured to the base and the other of which is secured to the rod, a spring element releasably interlocking the two parts, and means to hold said spring in restrained condition actuated by longitudinal movement of said rod for elevating said platform.

2. A container for welding rods and the like comprising a tubular member, a platform slidable therein and adapted to sustain welding rods or the like within said member, a cap to cover the upper end of said member, a rod attached to said cap and to said platform and provided with a handle for simultaneously removing the cap and elevating the platform to raise the welding rods above the upper end of the tubular member, a base supporting the tubular member, and a latch device between the platform and the base removably locking the platform in its lower position, said latch device comprising a hollow boss at the lower end of the rod, a pedestal secured to the base of the tubular member with a flange at the upper end thereof adapted to lie wtihin the hollow boss, a ring adapted to slide on the pedestal, and a spring within the hollow boss adapted in one position to expand into the area between the flange and the ring for locking the parts together and adapted to be compressed by depressing it upon the ring whereby upon moving the rod upwardly the ring carries the spring with it in a compressed condition in which it will pass the flange and allow the rod and its dependent parts to be withdrawn.

3. A container for welding rods and the like comprising a tubular member, a platform slidable therein and adapted to sustain welding rods or the like within said member, a cap to cover the upper end of said member, a rod attached to said cap and to said platform and provided with a handle for simultaneously removing the cap and elevating the platform to raise the welding rods above the upper end of the tubular member, a base supporting the tubular member, and a latch device between the platform and the base removably locking the platform in its lower position, said latch device comprising a hollow boss at the lower end of the rod, a pedestal secured to the base of the tubular member with a flange at the upper end thereof adapted to lie within the hollow boss, a ring adapted to slide on the pedestal, a spring within the hollow boss adapted in one position to expand into the area between the flange and the ring for locking the parts together and adapted to be compressed by depressing it upon the ring whereby upon moving the rod upwardly the ring carried by the spring retains the latter in a compressed condition in which it will pass the flange and allow the rod and platform to be withdrawn, and a second spring yieldably retaining the rod in position for locking said base and platform together.

4. A releasable latch for a container or the like having an opening and a movable closure member therefor, said latch including a pedestal secured to a fixed element of the container and extending toward said closure member and having an annular groove, a ring member shorter than said groove and fitting snugly around said pedestal in said groove, the outside diameter of said ring member being at least equal to the diameter of the outer end of said pedestal, a thimble-like member having an internal diameter of its shell constructed to fit snugly around said ring on said pedestal, an internal annular groove in the shell of said thimble, movable means connecting said thimble and said closure member, an annular spring member positioned in said internal groove, said spring member having a U shaped cross-section and being so positioned in said groove and having tension that one of its arm portions tends to move inwardly and engage against the shoulder of the outer end portion of said pedestal and fasten said thimble and said pedestal together when said thimble member is pushed inwardly a short distance over said pedestal, said spring arm being yieldable to ride upon said ring member when said thimble member is pushed farther in over said pedestal, whereby said thimble member and said spring member may be removed from around said rod and said closure member may be opened.

5. A releasable latch including a pedestal member having an annular groove adjacent one end, a sleeve shorter than said groove and engaging snugly around said pedestal in said groove to be movable lengthwise therein, the outside diameter of said sleeve being at least equal to the diameter of the outer end of said pedestal adjacent said groove, a thimble member having an internal diameter of its shell to fit snugly over said sleeve, and spring means carried by said thimble constructed and arranged for engaging behind the shoulder of said pedestal at the outer end of said groove when said thimble is pushed on over the outer end of said pedestal a predetermined amount to latch said thimble to said pedestal, said spring means being effective to ride up on said ring member when said thimble is pushed inwardly an additional predetermined amount whereby said thimble may be removed thereafter from said pedestal.

EDGAR C. YOUNG.